Patented Sept. 28, 1926.

1,601,233

UNITED STATES PATENT OFFICE.

HENRY BLUMENBERG, JR., OF LOS ANGELES, CALIFORNIA, ASSIGNOR TO STOCKHOLDERS SYNDICATE, OF LOS ANGELES, CALIFORNIA, A CORPORATION OF CALIFORNIA.

PROCESS OF MAKING DIAMMONIUM PHOSPHATE.

No Drawing.     Application filed April 30, 1925.   Serial No. 27,068.

My invention relates to a process of making diammonium phosphate.

It is an object of this invention to provide a simple, efficient and economic process of making diammonium phosphate direct from crude phosphate, such as calcium phosphate rock $Ca_3(PO_4)_2$ by treating the same with ammonia in aqueous solution, and the process depends upon my discovery that the phosphate will re-act with ammonia in the presence of sulphur dioxide.

My invention consists in the steps of the process hereinafter described and claimed.

Finely ground crude phosphate rock $Ca_3(PO_4)_2$ is mixed with the aqueous solution of ammonia, and the mixture is charged with sulphur dioxide, which produces calcium sulphite and di-ammonium phosphate is accordance with the following equation:

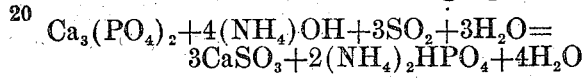
$$Ca_3(PO_4)_2 + 4(NH_4)OH + 3SO_2 + 3H_2O = 3CaSO_3 + 2(NH_4)_2HPO_4 + 4H_2O$$

The present process has the advantage over the process described in my copending application Serial No. 27,067 filed April 30, 1925, describing treating calcium phosphate with ammonium sulphate in the presence of sulphur dioxide. In the present process sulphur dioxide re-acts only with calcium carbonate and phosphate of the phosphate rock, thereby making a pure product. Sulphur dioxide may be easily and economically produced at little expense at the plant. The main advantage of the present application over the process described in the copending application just referred to, is that the final product, di-ammonium phosphate, may be heated to from 300 to 400° C., thereby yielding orthophosphoric acid and ammonia, which may be used in a continuous cycle in the treatment of crude phosphate rock, in accordance with the chemical equation above stated. It will be appreciated that the present process lends itself to an easy and economic production of phosphoric acid if there should be a greater demand for the same than for di-ammonium phosphate, and in this manner the process may produce either the di-ammonium phosphate or phosphoric acid, as desired. In the latter instance, the ammonia is used for treating additional quantities of phosphate rock.

My process may also be used where the corresponding alkali metal phosphate is desired as the end product by substituting the alkali metal hydroxide such as sodium or potassium hydroxide for the aqueous ammonia.

It is intended that the term alkali metal as used in the claims includes ammonium.

Various changes may be made in the steps of the process by those skilled in the art, without departing from the spirit of my invention, as claimed.

I claim:

1. A process of making an alkali metal phosphate from crude calcium phosphate comprising subjecting the finely ground calcium phosphate to alkali metal hydroxide in the presence of sulphur dioxide to form the alkali metal phosphate.

2. A process of making di-ammonium phosphate from crude calcium phosphate comprising subjecting the finely ground calcium phosphate to an aqueous solution of ammonia in the presence of sulphur dioxide to form di-ammonium phosphate.

In testimony whereof I have signed my name to this specification.

HENRY BLUMENBERG, JR.